United States Patent [19]

Sugiura

[11] Patent Number: 4,588,503

[45] Date of Patent: May 13, 1986

[54] LIQUID FILTER ASSEMBLY

[76] Inventor: Eiichi Sugiura, 149, Matsumotocho, Hekinan-shi, Aichi, Japan

[21] Appl. No.: 593,195

[22] Filed: Mar. 27, 1984

Related U.S. Application Data

[63] Continuation of Ser. No. 403,545, Jul. 30, 1982, abandoned.

[30] Foreign Application Priority Data

Jul. 29, 1981 [JP] Japan ................................. 56-118652

[51] Int. Cl.$^4$ ............................................. B01D 25/00
[52] U.S. Cl. ..................................... 210/232; 210/439; 210/456
[58] Field of Search ................ 210/130, 232, 437–439, 210/440, 443, 450, 451, 456, 493.4, 497.1, 350–352, 418, 499, 501, 502

[56] References Cited

U.S. PATENT DOCUMENTS

| | | | |
|---|---|---|---|
| 2,073,442 | 3/1937 | Briggs | 210/352 |
| 3,221,880 | 12/1965 | Wilkinson | 210/440 X |
| 3,266,628 | 8/1966 | Price | 210/440 X |

Primary Examiner—John Adee
Attorney, Agent, or Firm—Robert E. Burns; Emmanuel J. Lobato; Bruce L. Adams

[57] ABSTRACT

A liquid filter assembly is provided including a roll filter disposed within a casing. A contaminated liquid is supplied to a space adjacent to one end face of the roll filter for passage therethrough. A filter member formed of a material such as non-woven fabric covers the end face of the roll filter where the liquid is supplied, and the filter member is in turn covered by a filter retaining disc so that the filter member is normally urged against the roll filter. The retaining disc is formed with a number of openings to pass the liquid therethrough, thus preventing the liquid pressure from being directly applied to the roll filter.

4 Claims, 2 Drawing Figures

LIQUID FILTER ASSEMBLY

This is a continuation of application Ser. No. 403,545, filed July 30, 1982, now abandoned, which claims priority of Japanese Patent Application No. 56-118652 filed July 29, 1981.

FIELD AND BACKGROUND OF THE INVENTION

The invention relates to a liquid filter assembly for removing impurities contained in a liquid, and more particularly, to such an assembly including a filter in the form of a roll through which a liquid is passed for filtering action.

A liquid filter assembly including a filter in the form of a roll which separates and recovers impurities contained in a liquid is known in the art. The filter comprises a roll of paper sheet when the liquid is to be filtered is oily, and comprises a roll of synthetic resin sheet such as polypropylene when the to be filtered is aqueous. The roll is coaxially received in a cylindrical shell, and contaminated liquid to be filtered is pumped to the top of the shell for filtering purpose. In the use of such assembly, as contaminated liquid is passed through the top of the roll filter, the adsorption of sludges begins from the top of the filter, causing a plugging which produces a resistance to the passage of the contaminated liquid. If the supply of contaminated liquid is continued when the passage thereof through the filter encounters an increased resistance, the supply pressure increases, which causes cracks to be produced in a portion of the roll filter. The cracks produced in the filter tend to be widened under the pressure of the contaminated liquid, allowing the contaminated liquid to be externally discharged through these cracks and a drain port without being filtered, thus degrading the filtering performance. While the occurrence of cracks may be prevented by reducing the supply pressure of the contaminated liquid, this reduces the filtering efficiency.

SUMMARY OF THE INVENTION

It is an object of the invention to provide a liquid filter assembly which prevents the occurrence of cracks in a roll filter as the filtration process proceeds, by providing a substantially uniform distribution of liquid flow all over the roll filter.

It is another object of the invention to provide a liquid filter assembly in which the direct application of the liquid pressure to the roll filter is avoided and in which a filter member is also provided on the effluent side of the roll filter so as to cover the end surface thereof, thus preventing a direct discharge of a contaminated liquid in the event the performance of the roll filter is degraded.

In accordance with the invention, there is provided a liquid filter assembly comprising a cylindrical casing, a filter in the form of a roll of paper or synthetic resin and coaxially received within the casing, an injection pipe for injecting a contaminated liquid into one end of the roll filter, an upper filter member such as a non-woven fabric disposed so as to cover one end of the roll filter, and a filter retaining disc covering the upper filter member and urging it against the roll filter. An opening at one axial end of the casing is closed by a bottomplate having a discharge opening formed therein for passage of a filtered liquid. The roll filter has an axial length which is less than the axial length of the casing, and an axially extending bore is formed in alignment with the axis of the roll filter. The injection pipe extends through the axial bore, and has its one end projecting into a space defined by the internal surface of the casing and the upper surface of the filter retaining disc. The pipe is formed with a port or ports for injection of a contaminated liquid in the region of such projection. In order to allow a contaminated liquid to be supplied to the upper filter member, the filter retaining disc is formed with a number of openings, and a liquid distributing groove or grooves formed in the end of the disc located nearer the upper filter member. Consequently, the upper filter member produces a primary filtration of the contaminated liquid, thus removing sludges therefrom, and the contaminated liquid is then subject to a secondary filtration by the roll filter. As the openings and groove in the filter retaining disc as well as the upper filter member become increasingly plugged with sludges, the upper filter member acts as a cushioning member to prevent any undue or excessive filtering pressure to be directly applied to the roll filter.

In a preferred embodiment of the invention, a plate having a number of through-openings formed therein is interposed between the upper filter member and the filter retaining disc. The plate further reduces the filtering pressure. The filter retaining disc is formed of a material such as iron or casting having an increased specific weight, so that their gravity urges the upper filter member. Alternatively, the upper filter member may be resiliently urged by a spring.

In the liquid filter assembly of the invention, a lower filter member, similar to the upper filter member is interposed between the other end of the roll filter and the bottomplate of the casing, thus allowing the lower filter member to prevent a direct discharge of a contaminated liquid in the event the filtering performance of the roll filter is degraded.

DESCRIPTION OF THE PREFERRED EMBODIMENTS

Figure 1:
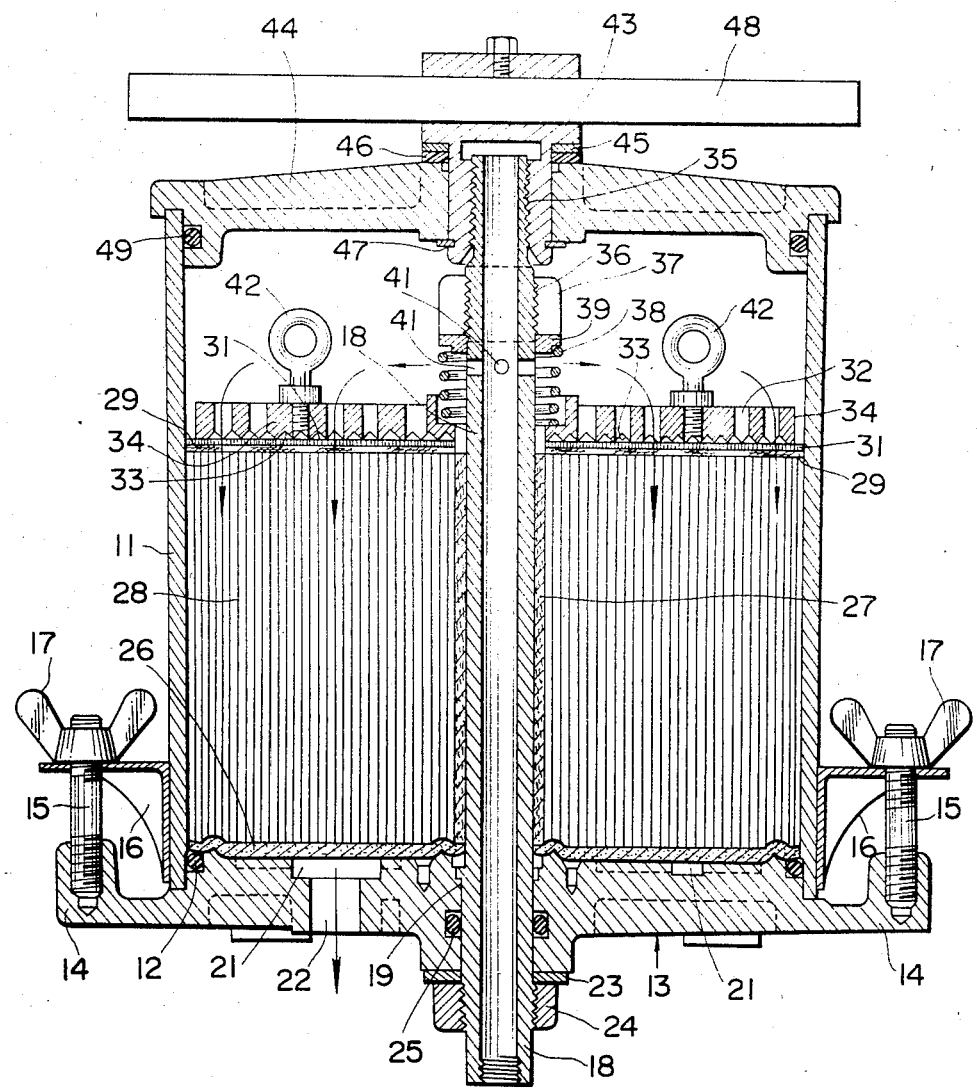
FIG. 1 is a longitudinal section of a liquid filter assembly according to one embodiment of the invention.

Referring to FIG. 1 illustrating a liquid filter assembly according to one embodiment of the invention, the assembly includes a cylindrical metal casing 11, the bottom opening of which is closed by a bottomplate 13 which is tightly fitted therein with an O-ring 12 interposed therebetween. The bottomplate 13 defines a flange 14 in which mounting screws 15 are threadably engaged at a suitable circumferential spacing. It is to be noted that these mounting screws 15 are formed with threads on their opposite ends, with their lower threads engaging threaded bores formed in the flange 14 for securement. The upper end of the mounting screw 15 extends through an opening formed in a fixture 16 which is fixedly connected with the periphery of the casing 11 adjacent to its bottom, there being a number of fixtures 16 which are equal to the number of screws 15. The upper thread of the mounting screw 15 projecting above the opening is threadably engaged by a nut 17.

A contaminated liquid injection pipe 18 extends through an opening 19 formed centrally in the bottomplate 13, the upper surface of which is formed with a guide groove 21 which is used for collecting the cleaned and filtered liquid. A portion of the guide groove 21 communicates with a drain port 22 which is formed to extend through the bottomplate 13. It is to be understood that the injection pipe 18 is disposed in coaxial relationship with the casing 11, with its lower end extending below the lower surface of the bottomplate 13 where it is formed with threads to threadably receive a nut 24, with a washer 23 interposed therebetween. In this manner, the bottomplate 13 is secured to the casing 11 by means of the nuts 24, 17. It will be seen that an O-ring 25 is received in the internal surface of the opening 19 to prevent a liquid leakage through the opening 19. A lower non-woven fabric 26 is placed on top of the upper surface of the bottomplate 13. While a single fabric is shown in FIG. 1, it is to be understood that a plurality of fabrics may be disposed as desired.

A take-up paper sleeve 27 is tightly fitted over the injection pipe 18 within the casing 11, and receives a roll of filter material 28 thereon. The roll filter 28 has a diameter such that its outer periphery is in close contact with the internal surface of the casing 11. The roll filter 28 has an axial length which is greater than one-half the axial length of the casing 11. The filter 28 is formed by a filter material comprising a meshwork of fine fibers of paper or synthetic resin such as polypropylene.

An upper non-woven fabric 29, similar to the lower non-woven fabric 26, is laid on the upper end face of the roll filter 28. A metal punching plate 31 having a number of openings extending axially therethrough is placed on top of the upper fabric 29 so as to entirely cover it. A filter material retaining disc 34 is movably placed on top of the plate 31, and is formed with a plurality of openings 32 extending therethrough and a plurality of fluid distributing grooves 33 having an inverted conical cross section and which communicate with the lower end of the openings 32. On its upper end, the injection pipe 18 is formed with a first thread 35, and a second thread 36 which is downwardly spaced from the first thread. A nut 37 is engaged with the second thread 36, and bears against a coiled compression spring 38 which is disposed on the injection pipe 18 between the nut 37 and the retaining disc 34, with a washer 39 interposed between the spring and the nut. In the region of the spring 38, the injection pipe 18 is formed with a plurality of circumferentially spaced outlet ports 41 for a contaminated liquid. As the nut 37 is tightened, the resilience of the spring 38 urges the retaining disc 34 and the fabric 29 against the roll filter 28. It is to be noted that suspension fittings 42 are mounted on the top surface of the retaining disc for use in suspending the retaining disc 34.

A top cover 44 is fitted into the upper opening of the casing 11, and has a central opening through which a clamping fixture 43 extends for threadable engagement with the first thread 35 on the injection pipe 18, with a washer 45 and a gasket 46 interposed between the fixture 43 and the upper surface of the top cover 44. It will be noted that a snap ring 47 is interposed between the lower surface of the top cover 44 and the fixture 43. As shown, the fixture 43 is provided with a rotary handle 48 on its top for tightening the fixture. An O-ring 49 is fitted into the peripheral surface of the top cover 44 in the region where it is fitted into the casing 11.

In operation, a contaminated liquid is supplied into the bottom of the injection pipe 18 by means of a pump, not shown, whereby the liquid is pumped through the outlet ports 41 into a region over the filter retaining disc 34. The contaminated liquid then passes through the individual openings 32 and through the fluid distributing grooves 15 and the plate 13 to be distributed over the non-woven fabric 29 under pressure. The pressure of the contaminated liquid distributed over the fabric 29 causes it to pass through the interior of the roll filter 28, whereby sludges contained in the liquid are adsorbed by the roll filter 28. After passing through the roll filter 28, the liquid is then filtered by the lower fabric 26 to produce a clean liquid, which is then collected by the guide groove 21 formed in the bottomplate 13 to be delivered through the drain port 22.

It will thus be seen that the sludges contained in the contaminated liquid is initially subject to a primary filtration by the upper fabric 29 which is compressed by the spring 38, and is then subject to a secondary filtration by the roll filter 28. If an increasing degree of plugging is caused by the sludge, the resulting filtering pressure is not directly applied to the roll filter 28, but acts on the filter 28 through the upper fabric 29. In this manner, the filtering pressure is reduced, and hence the possibility for cracks to be produced in the roll filter 28 is reduced. If cracks are produced, the upper end of the roll filter 28 is held in place by the upper fabric 29 against movement, thus suppressing the likelihood that the cracks tend to extend further. The lower fabric 26 is laid below the lower end of the roll filter 28. Accordingly, if an increased amount of sludge is deposited on the roll filter 28 to cause a partial cracking thereof to thereby allow the contaminated liquid to be forced through the cracks under pressure, it cannot pass through the lower fabric 26 without being filtered thereby. In other words, the lower fabric 26 presents a resistance to a flow of the contaminated liquid which may be produced by a partial cracking of the roll filter 28, thereby distributing liquid throughout the roll filter to reduce pressure differentials thereacross. As a result, the cracks tend to be reduced in size, causing a distributed flow throughout the entire interior of the filter 28. This is effective to maintain the precision of filtration and to increase the useful life of the filter assembly to as long as ten times the usual value. In addition, the normal filtering pressure can be established at a higher value, allowing the throughput per unit time to be increased.

Figure 2:
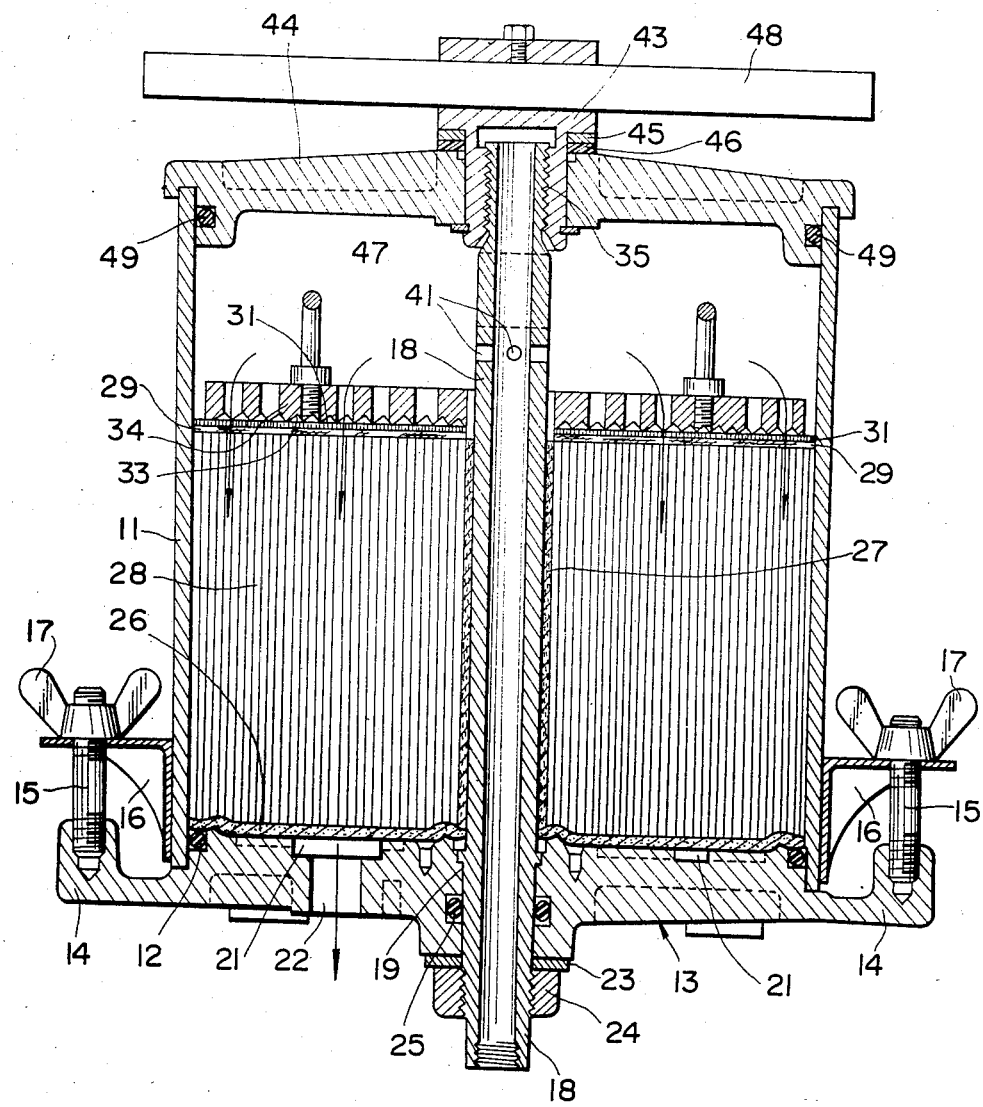
FIG. 2 is a longitudinal section of another embodiment of the invention.

FIG. 2 shows another embodiment of the invention in which the upper non-woven fabric 29 is urged against the roll filter 28 by the weight of a filter retaining disc 51. In this instance, the retaining disc 51 is formed of a material such as iron or casting which has a sufficient weight to bias the upper fabric 29. Accordingly, this second embodiment dispenses with the nut 27 and the compression spring 38 used in the first embodiment, simplifying the arrangement. In other respects, the arrangement and operation are quite similar to those described above in connection with the first embodiment, and therefore will not be described in detail while retaining the same reference numerals as used before.

What is claimed is:
1. A liquid filter assembly, comprising:
a cylindrical casing positionable in an upstanding position and having an upper end and a lower end;
a roll of filtering material disposed within said casing and having a length dimension less than said casing and oriented upstanding within said casing when said casing is positioned upstanding so as to define within said casing an open space above an upper end face of said roll of filtering material;

a non-woven fabric sheet-like filter element disposed on and covering said upper end face of said roll of filtering material;

a filter element retainer movably disposed within said casing and resting on said sheet-like filter element so as to press said sheet-like filter element against the upper end face of said roll of filtering material, said filter element retainer comprising a disc having a pair of opposed flat surfaces and having openings therethrough which open at said flat surfaces to define liquid flow paths from the open space within said casing above said roll of filtering material down to said sheet-like filter element, one of said disc flat surfaces having surface grooves for defining liquid flow paths thereacross, and said disc being positioned with said one flat surface having the surface grooves pressing against said sheet-like filter element;

means for biasing said filter element retainer to press said sheet-like filter element against the upper end face of said roll of filtering material;

means defining an inlet for introducting liquid to be filtered into the open space within said casing above said roll of filtering material; and means defining an outlet for removing filtered liquid after it has flowed through said sheet-like filter element and said roll of filtering material.

2. A liquid filter assembly according to claim 1, further comprising a second non-woven fabric sheet-like filter element disposed on and covering a lower end face of said roll of filtering material.

3. A liquid filter assembly according to claim 1; wherein the means for biasing comprises means for resiliently biasing said filter element retainer against said non-woven fabric sheet-like filter element to compress the same between said filter element retainer and said roll of filtering material.

4. A liquid filter assembly according to claim 1; wherein the means for biasing consists essentially of the weight of said filter element retainer, the weight being sufficient to compress said non-woven fabric sheet-like filter element between said filter element retainer and said roll of filtering material.

* * * * *